United States Patent [19]
Boldrin

[11] 4,063,598
[45] Dec. 20, 1977

[54] SOIL CULTIVATOR

[76] Inventor: Luigi Boldrin, 3 Via Puccini, Mestre, Italy

[21] Appl. No.: 721,717

[22] Filed: Sept. 9, 1976

[30] Foreign Application Priority Data

Sept. 9, 1975 Italy .................................. 12782/75

[51] Int. Cl.$^2$ ............................................ A01B 19/02
[52] U.S. Cl. .................................................... 172/705
[58] Field of Search ............... 172/710, 265, 264, 266, 172/261, 705, 711, 462

[56] References Cited

U.S. PATENT DOCUMENTS

| | | | |
|---|---|---|---|
| 1,951,701 | 3/1934 | Majar | 172/710 X |
| 2,312,405 | 3/1943 | Haagen | 172/264 |
| 3,042,122 | 7/1962 | Anderson | 172/265 |

FOREIGN PATENT DOCUMENTS

| | | | |
|---|---|---|---|
| 82,403 | 3/1957 | Denmark | 172/265 |
| 1,129,076 | 9/1956 | France | 172/705 |
| 648,601 | 11/1962 | Italy | 172/710 |

Primary Examiner—Richard J. Johnson
Attorney, Agent, or Firm—Spencer & Kaye

[57] ABSTRACT

A soil cultivator comprising a supporting frame; means for attachment of said frame to a tractor; a first lever arm pivoted at one end to said frame, a second lever arm pivoted at an intermediate position to the other end of said first lever arm, said second lever arm being provided with a first arm portion extending downwardly below said intermediate pivot point and having secured thereto a shovel or the like soil working tool, and with a second arm portion integral with said first lever arm portion and extending upwardly above said intermediate pivot point, the free end of said second arm portion being into sliding engagement with a fixed guide element secured to said support frame, and being urged downwardly along said guide element by spring means, while it may be caused to slide upwardly along said guide means in opposition to the force of said spring by effect of the resistance opposed by the soil to the progress of the working tool, so as to only partially lift the working tool with respect to the soil by an amount proportional to the soil resistance encountered, while maintaining it at all times into substantial operating and working engagement with the soil.

5 Claims, 3 Drawing Figures

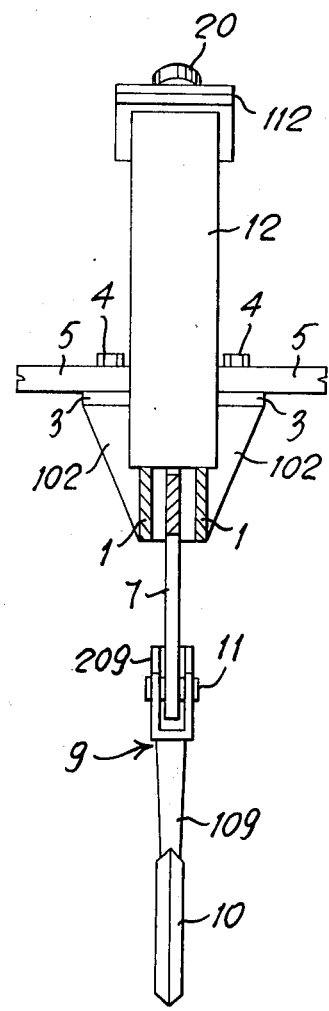
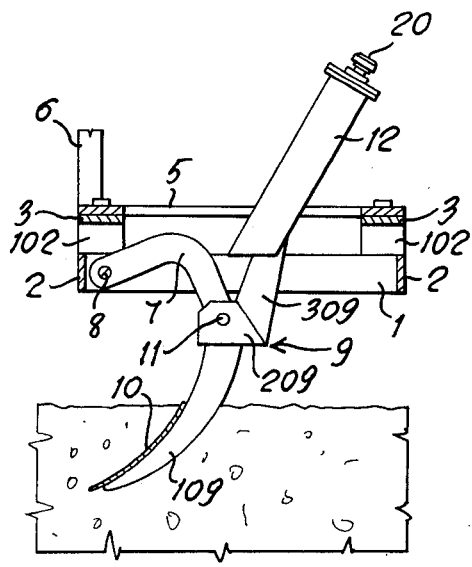
Fig. 2
Fig. 3

SOIL CULTIVATOR

BACKGROUND OF THE INVENTION

This invention relates to a soil cultivation or hoeing implement for agricultural machines.

These implements employ various shapes of steel shovels to work the soil. Typical shovels are short, narrow, curved, pointed steel pieces, that dig into the soil in proportion to the pressure applied.

Usually, the said shovels are secured to one end of a suitable support arm, the said support arms being in turn pivoted by their other free ends to a suitable frame structure, provided with means for attachment to a tractor. Spring means are provided between said arms and said support frame for constantly urging said arms to a position in which the said shovels are in correct working engagement with the soil. By the above arrangement, whenever the said implements encounter a soil resistance which is greater than the elastic force exerted by the said springs, the implements are pivoted about their pivots in opposition to the force of said springs, to a position in which the shovels are extracted from the soil into inoperative position. As soon as the soil resistance decreases, the implements are again extended to working position into the soil by the pressure exerted by the springs.

The above feature of the prior art cultivators is very objectionable.

In fact, it happens very often that substantial lengths of the soil are not, or are only partially manipulated by the cultivating implements due to the above reasons.

It is therefore the main object of the present invention to provide a soil cultivating implement for use in soil cultivators which obviates to the above mentioned drawbacks of the prior art devices.

SUMMARY OF THE INVENTION

According to the invention, this object is attained by providing, in a soil cultivator comprising a supporting frame, means for attachment of said frame to a tractor, a first lever arm pivoted at one end to said frame, a second lever arm pivoted at an intermediate position to the other end of said first lever arm, said second lever arm being provided with a first arm portion extending downwardly below said intermediate pivot point and having secured thereto a shovel or the like soil working tool, and with a second arm portion integral with said first lever arm portion and extending upwardly above said intermediate pivot point, the free end of said second arm portion being into sliding engagement with a fixed guide element secured to said support frame, and being urged downwardly along said guide element by spring means, while it may be caused to slide upwardly along said guide means in opposition to the force of said spring by effect of the resistance opposed by the soil to the progress of the working tool, so as to only partially lift the working tool with respect to the soil by an amount proportional to the soil resistance encountered, while maintaining it at all times into substantial operating and working engagement with the soil.

The above and other features of the present invention will become evident from the following description of one preferred embodiment of the invention, made with reference to the accompanying drawings.

BRIEF DESCRIPTION OF THE DRAWINGS

In the drawings:

FIG. 2 is a front view of the cultivator of FIG. 1, partially sectioned along line II—II of FIG. 1, and FIG. 3 is a partially sectioned side view of the cultivator of FIG. 1, in a reduced scale, with the cultivating tool shown in a partially retracted, but still operative position.

DESCRIPTION OF THE PREFERRED EMBODIMENT OF THE INVENTION

Figure 1:
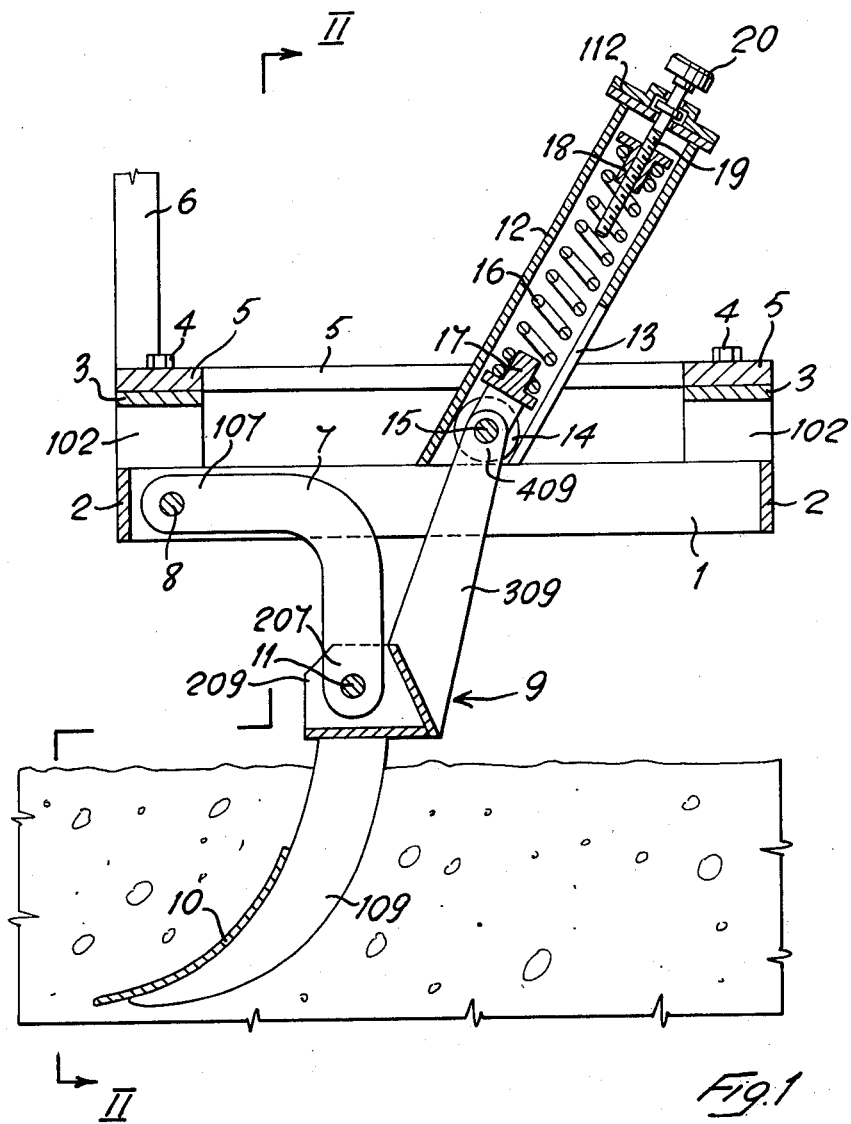
FIG. 1 is a partially sectioned side view of a cultivator according to the invention, with the cultivating tool fully extended into the soil.

With reference to the drawings, the cultivating implement shown comprises two spaced parallel side plates 1, connected endwise together by means of two distance pieces 2. each plate 1 is provided at its ends with two upwardly projecting shanks 102, the confronting shanks 102 of each pair of plates 1 being each connected together by a cross bar 3, extending sidewise outwardly a certain distance from the side plates 1. The outwardly extending wings of the cross bars 3 are provided with means, and for instance with bolts 4, for attachment to the cultivator frame 5. The frame 5 is in turn provided in conventional manner with means 6 for attachment to a tractor.

A bell-crank lever 7 is pivotably connected at its end 107 between the plates 1 in proximity of the fore end of said plates, by means of the pivot pin 8, with its other end 207 directed downwardly.

Reference 9 generally denotes a lever arm, comprising a curved lower portion 109 to the concave fore edge of which the shovel 10 is fastened.

The said lower portion 109 of lever arm 9 is provided at its upper end with a fork 209, to which the depending end 207 of bell crank lever 7 is pivotably connected by means of pivot pin 11.

To the rear end of said fork 209 the lower end of the upper portion 309 of lever arm 9 is made integral, the said upper portion 309 of lever arm 9 extending upwardly between and above the plates 1 with its upper end 409. In correspondence of the upper end 409 of lever arm 9, a box 12 is secured in subvertical position by its lower end to the plates 1. The lower end of said box 12 is open, and the upper portion 309 of lever 9 projects through said opening inside box 12 with its end 409. The box 12 is further provided on its rearwardly directed side, between plates 1, with a longitudinal slit extending from a position corresponding substantially to one half of the height of box 12 downwardly up to the space between the plates 1. To the free end 409 of lever arm portion 309, inside of box 12, two rollers 14 are pivotably secured by means of pivot pin 15. The said rollers are disposed one at each side of lever arm 309, and abut in their lowermost position onto the upper edge of plates 1. Inside box 12 a helical spring 16 is compressed between a fore end block 17, abutting against the rollers 14, and a rear end block 18. The rear end block 18 is provided axially with a threaded through bore, in thread engagement with one end of a threaded spindle 19, the other end of which is passed in a rotatatably but not axially slidably manner through a central boring formed in the bottom end wall 112 of box 12. To the free end of spindle 19 projecting outside of box 12 an operating knob 20 is secured.

OPERATION OF THE DESCRIBED DEVICE

The operation of the described device will be evident. In normal operation, the working tool 10 is fully extended into the soil, as shown in FIG. 1. As soon as the resistance of the soil increases over a certain value preset by the elastic force of spring 16, the arm 309 will be urged upwardly into guide box 12, in opposition to the force exerted by spring 16.

The upward movement of arm 309, combined with the rocking movement of lever arm 7, will result into a lifting movement of the working tool 10 for an amount proportional to the resitance encountered. However, during this lifting movement the working tool will be always maintained into working relationship with the soil, and only the depth of the furrow will be affected. In FIG. 3 the cultivating implement is shown with the working tool raised by the maximum amount allowed by the device according to the invention.

By acting on knob 20, it is possible to adjust the force exerted by spring 16.

Having thus described my invention, I claim:

1. A soil cultivator comprising a supporting frame; means for attachment of said frame to a tractor; a first lever arm pivoted at one end to said frame, a second lever arm pivoted at an intermediate position to the other end of said first lever arm, said second lever arm being provided with a first arm portion extending downwardly below said intermediate pivot point and having secured thereto a shovel or the like soil working tool, and with a second arm portion integral with said first arm portion and extending upwardly above said intermediate pivot point, a fixed guide element secured to said support frame, the free end of said second arm portion being in sliding engagement with and being urged downwardly along said guide element by spring means while being caused to slide upwardly along said guide means in opposition to the force of said spring by effect of the resistance opposed by the soil to the progress of the working tool, so as to only partially lift the working tool with respect to the soil by an amount proportional to the soil resistance encountered, while maintaining it at all times in substantial operating and working engagement with the soil without substantially changing its angle of attack with respect thereto.

2. A soil cultivator according to claim 1, in which the said first lever arm is in the form of a bell-crank lever.

3. A soil cultivator according to claims 1, in which the said fixed guide element is in the form of a box open at its lower end and closed at its upper end, and provided with a longitudinal slit at one side, a helical spring housed inside of said box, coaxially to the longitudinal axis of the box, said spring being compressed between two end blocks, means operable from the exterior of the box for adjusting the compression of said spring by shifting the upper end block longitudinally with respect to the housing box; the free end of said second lever arm extending inside of said box through the lower open end of said box and the said longitudinal slit into abutment with the lower end block, the said free end of said second lever arm being provided with abutment members for limiting the sliding movement of said second lever arm downwardly with respect to said box.

4. A soil cultivator according to claim 3, in which the free end of said second lever arm is provided sidewise with a pair of rollers, the said rollers abutting in the lowermost position of said second lever arm against the supporting frame of the cultivator.

5. A soil cultivator according to claim 3 in which the said first lever arm is in the form of a bell-crank lever.

* * * * *